(12) United States Patent
Niki

(10) Patent No.: US 10,046,801 B2
(45) Date of Patent: Aug. 14, 2018

(54) STEERING ASSIST CONTROL APPARATUS AND STEERING ASSIST CONTROL METHOD

(71) Applicant: TOYOTA JIDOSHA KABUSHIKI KAISHA, Toyota-shi, Aichi-ken (JP)

(72) Inventor: Keitaro Niki, Susono (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 189 days.

(21) Appl. No.: 14/879,432

(22) Filed: Oct. 9, 2015

(65) Prior Publication Data

US 2016/0101812 A1  Apr. 14, 2016

(30) Foreign Application Priority Data

Oct. 10, 2014 (JP) .................................. 2014-208824

(51) Int. Cl.

| | |
|---|---|
| *A01B 69/00* | (2006.01) |
| *B62D 6/00* | (2006.01) |
| *B62D 11/00* | (2006.01) |
| *B62D 12/00* | (2006.01) |
| *B63H 25/04* | (2006.01) |
| *B63G 8/20* | (2006.01) |
| *G05D 1/00* | (2006.01) |
| *G05F 7/00* | (2006.01) |
| *G06F 17/00* | (2006.01) |
| *G06F 19/00* | (2018.01) |

(Continued)

(52) U.S. Cl.
CPC ......... *B62D 15/025* (2013.01); *B62D 15/029* (2013.01); *G06K 9/00798* (2013.01)

(58) Field of Classification Search
CPC .... B62D 15/025; B62D 15/029; B62D 15/04; G06K 9/00798
USPC ........................ 701/41, 43; 340/435; 180/446
See application file for complete search history.

(56) References Cited

U.S. PATENT DOCUMENTS 9,169,922 B1 * 10/2015 Remes ................ F16H 61/0204
2005/0270145 A1 * 12/2005 Kataoka ............... B62D 15/029
340/435

(Continued)

FOREIGN PATENT DOCUMENTS

| CN | 1704861 A | 12/2005 |
|---|---|---|
| CN | 1874910 A | 12/2006 |

(Continued)

OTHER PUBLICATIONS

English Translation for JP2003040132A.*

*Primary Examiner* — Mahmoud S Ismail
(74) *Attorney, Agent, or Firm* — Sughrue Mion, PLLC

(57) ABSTRACT

In a steering assist control apparatus including a steering assist control unit that controls the steering of an own vehicle by a manipulated variable allowing the own vehicle to run along a lane recognized by a lane recognition unit, and a control stop unit that decrease the manipulated variable with time when an abnormality detection unit detects a recognition abnormality in the lane recognition unit, the control stop unit decreases the manipulated variable at a manipulated variable decrease rate corresponding to a manner of the recognition abnormality. Thereby, at the time of the occurrence of the abnormality, it is possible to more adequately decrease the manipulated variable for the steering assist control, corresponding to the manner of the abnormality.

7 Claims, 5 Drawing Sheets

(51) Int. Cl.
    *B62D 15/02*    (2006.01)
    *G06K 9/00*     (2006.01)
    *B60Q 1/00*     (2006.01)
    *B62D 5/04*     (2006.01)

(56) References Cited

U.S. PATENT DOCUMENTS

| | | | |
|---|---|---|---|
| 2006/0217861 A1* | 9/2006 | Ihara | B62D 15/029 |
| | | | 701/41 |
| 2007/0029129 A1* | 2/2007 | Shiozawa | B62D 6/04 |
| | | | 180/446 |
| 2007/0219688 A1 | 9/2007 | Gut et al. | |
| 2010/0185363 A1* | 7/2010 | Buerkle | B62D 15/025 |
| | | | 701/41 |

FOREIGN PATENT DOCUMENTS

| | | | |
|---|---|---|---|
| DE | 102007061900 A1 | | 6/2009 |
| JP | 06305439 A | | 11/1994 |
| JP | 10-076964 A | | 3/1998 |
| JP | 2003-040132 A | | 2/2003 |
| JP | 2003040132 A | * | 2/2003 |

* cited by examiner

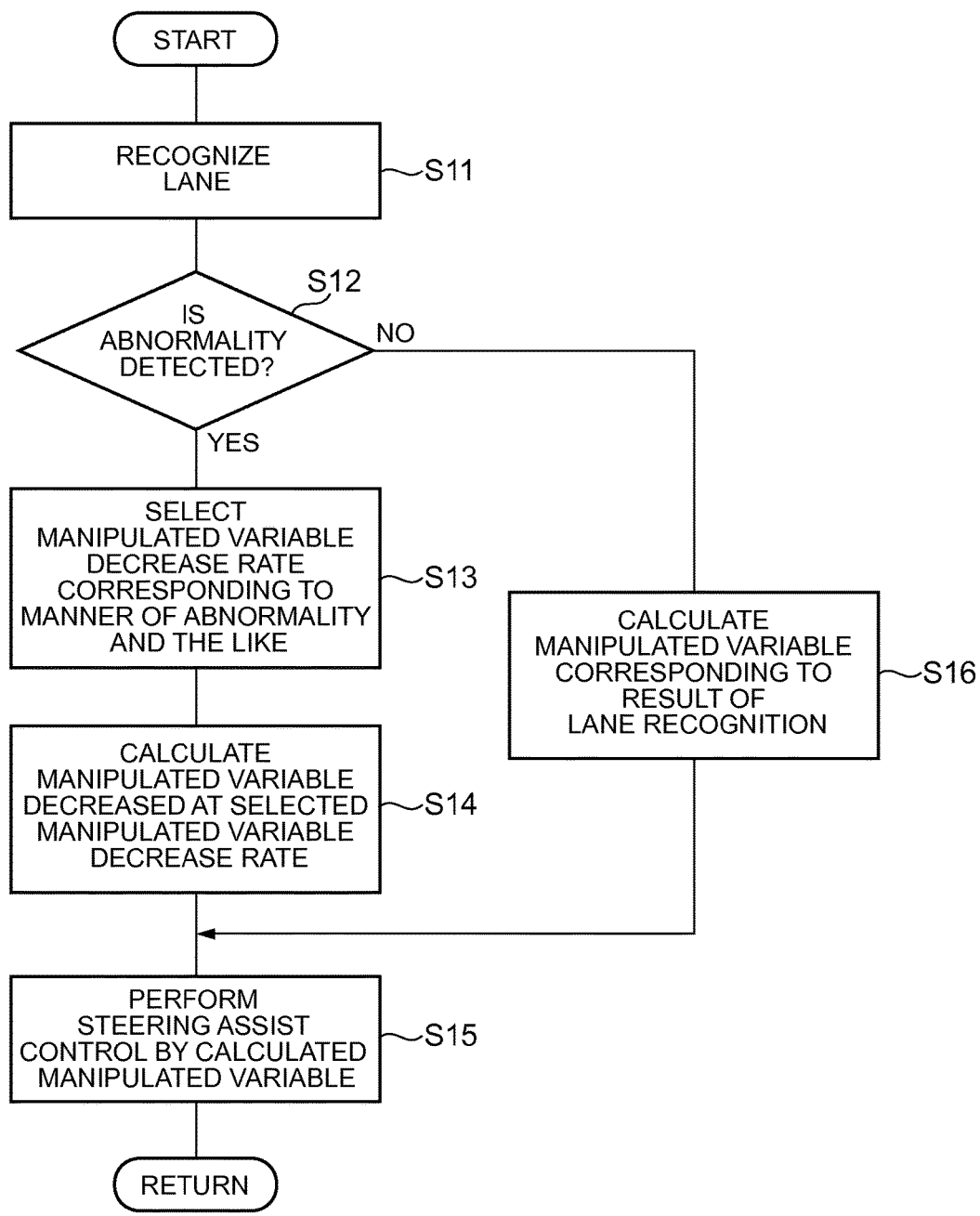

FIG. 3

| | MANNER OF ABNORMALITY | | STRAIGHT | CURVE |
|---|---|---|---|---|
| STEERING WHEEL IS NOT HELD | RECOGNITION ABNORMALITY | FIRST ABNORMALITY MANNER | MANIPULATED VARIABLE DECREASE RATE O | MANIPULATED VARIABLE DECREASE RATE T |
| | | SECOND ABNORMALITY MANNER | MANIPULATED VARIABLE DECREASE RATE N | MANIPULATED VARIABLE DECREASE RATE S |
| | | THIRD ABNORMALITY MANNER | MANIPULATED VARIABLE DECREASE RATE M | MANIPULATED VARIABLE DECREASE RATE R |
| | ACTION ABNORMALITY | CAN COMMUNICATION INTERRUPTION | MANIPULATED VARIABLE DECREASE RATE L | MANIPULATED VARIABLE DECREASE RATE Q |
| | | ECU ABNORMAL-VALUE OUTPUT | MANIPULATED VARIABLE DECREASE RATE K | MANIPULATED VARIABLE DECREASE RATE P |
| | | STEERING ACTUATOR ABNORMALITY | IMMEDIATE STOP | IMMEDIATE STOP |
| STEERING WHEEL IS HELD | RECOGNITION ABNORMALITY | FIRST ABNORMALITY MANNER | MANIPULATED VARIABLE DECREASE RATE E | MANIPULATED VARIABLE DECREASE RATE J |
| | | SECOND ABNORMALITY MANNER | MANIPULATED VARIABLE DECREASE RATE D | MANIPULATED VARIABLE DECREASE RATE I |
| | | THIRD ABNORMALITY MANNER | MANIPULATED VARIABLE DECREASE RATE C | MANIPULATED VARIABLE DECREASE RATE H |
| | ACTION ABNORMALITY | CAN COMMUNICATION INTERRUPTION | MANIPULATED VARIABLE DECREASE RATE B | MANIPULATED VARIABLE DECREASE RATE G |
| | | ECU ABNORMAL-VALUE OUTPUT | MANIPULATED VARIABLE DECREASE RATE A | MANIPULATED VARIABLE DECREASE RATE F |
| | | STEERING ACTUATOR ABNORMALITY | IMMEDIATE STOP | IMMEDIATE STOP | even of the occurrence text follows...

STEERING ASSIST CONTROL APPARATUS AND STEERING ASSIST CONTROL METHOD

INCORPORATION BY REFERENCE

The disclosure of Japanese Patent Application No. 2014-208824 filed on Oct. 10, 2014 including the specification, drawings and abstract is incorporated herein by reference in its entirety.

BACKGROUND OF THE INVENTION

1. Field of the Invention

An aspect of the invention relates to a steering assist control apparatus and a steering assist control method.

2. Description of Related Art

In recent years, as an apparatus to support the driving of an automobile, there has been proposed an apparatus that performs the steering assist control to control the steering of an own vehicle, by giving a steering manipulated variable to a steering system of the own vehicle such that the own vehicle runs along a lane. For example, Japanese Patent Application Publication No. 2003-040132 (JP 2003-040132 A) discloses an apparatus including: running lane information detection means 31 for detecting a lane line that demarcates a lane; and control means 14 for keeping an own vehicle in the lane by giving a steering control torque to a steering system as a manipulated variable, based on the information detected by the running lane information detection means 31. In the apparatus of JP 2003-040132 A, when a detectable state in which the running lane information detection means 31 can detect the lane line is changed into an undetectable state, the control means 14 sets the steering control torque such that the behavior change of the own vehicle can be suppressed, gradually decreases the steering control torque, and stops giving the steering control torque to the steering system.

By the way, in the case of the occurrence of a recognition abnormality that makes it impossible to normally recognize the lane, if the manipulated variable for the steering assist control is gradually decreased in the same way in common with the above apparatus of JP 2003-040132 A, the steering assist control is stopped, regardless of the manner of the recognition abnormality, similarly to the case of the occurrence of an ordinary recognition abnormality. Therefore, there has been desired an apparatus that, at the time of the occurrence of an abnormality, can more adequately decrease the manipulated variable for the steering assist control, corresponding to the manner of the abnormality.

For example, in a manner of the recognition abnormality in which the lane line cannot be detected for only an extremely short time because of a partial absence of the lane line or the like, the abnormality is highly likely to be dissolved, and therefore, it is desired that the manipulated variable for the steering assist control is decreased to zero over a relatively long time. Meanwhile, in a manner of the recognition abnormality in which a lane line of a branched road along which the own vehicle is not running is falsely detected as a lane line of a lane along which the own vehicle is running, the steering of the own vehicle is likely to be controlled in an inadequate direction, and therefore, it is desired that the manipulated variable for the steering assist control is decreased in a relatively short time.

SUMMARY OF THE INVENTION

Hence, the invention has an object to provide a steering assist control apparatus that recognizes a lane along which the own vehicle runs, using a pickup image in a travelling direction of the own vehicle, that controls the steering of the own vehicle such that the own vehicle runs along the lane, and that can more adequately decrease the manipulated variable for the steering assist control, at the time of the occurrence of an abnormality, corresponding to the manner of the abnormality.

A steering assist control apparatus according to an aspect of the invention includes: a lane recognition unit that recognizes a lane using a pickup image, the lane being a lane along which an own vehicle runs, the pickup image being a pickup image of a forward sight of the own vehicle in a travelling direction of the own vehicle; a steering assist control unit that gives a manipulated variable to a steering system of the own vehicle such that the own vehicle runs along the lane recognized by the lane recognition unit, the manipulated variable being a manipulated variable by which steering of the own vehicle is controlled; an abnormality detection unit that detects at least any one of (i) an abnormality in recognition of lane made by the lane recognition unit and a manner of the abnormality in the recognition and (ii) a control abnormality in the steering assist control unit and a manner of the control abnormality; and a control stop unit that decreases the manipulated variable with time, when the abnormality detection unit detects at least any one of the abnormality in recognition of lane made by the lane recognition unit and the control abnormality in the steering assist control unit, and the control stop unit decreases the manipulated variable at a manipulated variable decrease rate corresponding to at least any one of the manner of the abnormality in recognition and the manner of the control abnormality.

According to the configuration, the control stop unit decreases the manipulated variable at the manipulated variable decrease rate corresponding to the manner of the abnormality in recognition. Thereby, at the time of the occurrence of the abnormality, it is possible to more adequately decrease the manipulated variable for the steering assist control, corresponding to the manner of the abnormality.

In this case, the abnormality detection unit may detect a first abnormality manner, a second abnormality manner and a third abnormality manner, as the manner of the abnormality in recognition of lane made by the lane recognition unit, the first abnormality manner being an abnormality manner in which the lane recognition unit cannot discriminate a lane line from the pickup image, the lane line demarcating the lane, the second abnormality manner being an abnormality manner in which an interval between two of the lane lines discriminated by the lane recognition unit is broader than a previously set value, the third abnormality manner being an abnormality manner in which the position of the lane line discriminated by the lane recognition unit varies at a higher frequency than a previously set frequency, and the control stop unit may decrease the manipulated variable at a first manipulated variable decrease rate as the manipulated variable decrease rate when the abnormality detection unit detects the first abnormality manner, may decrease the manipulated variable at a second manipulated variable decrease rate as the manipulated variable decrease rate when the abnormality detection unit detects the second abnormality manner, the second manipulated variable decrease rate being higher than the first manipulated variable decrease rate, and may decrease the manipulated variable at a third manipulated variable decrease rate as the manipulated variable decrease rate when the abnormality detection unit detects the third abnormality manner, the third manipulated variable decrease rate being higher than the second manipulated variable decrease rate.

According to the configuration, the control stop unit decreases the manipulated variable at the first manipulated variable decrease rate when the abnormality detection unit detects the first abnormality manner, decreases the manipulated variable at the second manipulated variable decrease rate, which is higher than the first manipulated variable decrease rate, when the abnormality detection unit detects the second abnormality manner, and decreases the manipulated variable at the third manipulated variable decrease rate, which is higher than the second manipulated variable decrease rate, when the abnormality detection unit detects the third abnormality manner.

For example, in the case of the first abnormality manner in which the lane recognition unit cannot discriminate the lane line demarking the lane from the pickup image when the own vehicle runs along a curve having a great curvature or when the own vehicle runs at a section where the lane line is interrupted, it is expected that the lane recognition unit can recognize the lane line again after the own vehicle passes through the curve. Therefore, in the case where the manner of the recognition abnormality is the first abnormality manner, the manipulated variable is decreased at the first manipulated variable decrease rate, which is lower compared to the second manipulated variable decrease rate for the second abnormality manner and the third manipulated variable decrease rate for the third abnormality manner.

Further, in the case of the second abnormality manner in which the interval between the two lane lines discriminated by the lane recognition unit is broader than the previously set value, it is thought, for example, that the lane recognition unit has falsely discriminated a lane line demarcating a branched lane as the lane line of the lane along which the own vehicle runs. In this case, it is likely that the steering assist control unit performs an inadequate steering such as a steering in an intermediate direction between the lane along which the own vehicle runs and the branched lane. Therefore, in the case where the manner of the abnormality in recognition is the second abnormality manner, the manipulated variable is decreased at the second manipulated variable decrease rate, which is higher compared to the first manipulated variable decrease rate for the first abnormality manner.

Furthermore, in the case of the third abnormality manner in which the position of the lane line discriminated by the lane recognition unit varies at a higher frequency than the previously set frequency, it is thought, for example, that the lane recognition unit has recognized a lane line configured by a composite line of a solid line and a broken line. In this case, it is likely that the recognition of the lane line by the lane recognition unit is unstable over a relatively long time. Therefore, in the case where the manner of the abnormality in recognition is the third abnormality manner, the manipulated variable is decreased at the third manipulated variable decrease rate, which is higher compared to the second manipulated variable decrease rate for the second abnormality manner. Thus, even when the abnormality in recognition occurs, it is possible to more adequately decrease the manipulated variable for the steering assist control, corresponding to the manner of the abnormality in recognition.

Further, the steering assist control apparatus may include a curvature acquisition unit that acquires curvature of the lane along which the own vehicle runs, and when the curvature acquired by the curvature acquisition unit is a previously set threshold or more, the control stop unit, for the same manner of the recognition abnormality, may decrease the manipulated variable at a lower manipulated variable decrease rate than a manipulated variable decrease rate when the curvature is less than the threshold.

In a curve having a great curvature, when the manipulated variable is decreased at a higher manipulated variable decrease rate, the behavior of the own vehicle is likely to be unstable. Hence, according to the configuration, when the curvature of the lane along which the own vehicle runs is the previously set threshold or more, the manipulated variable is decreased at a lower manipulated variable decrease rate than a manipulated variable decrease rate when the curvature is less than the threshold, for the same manner of the recognition abnormality. Therefore, in a curve having a great curvature, it is possible to enhance the stability of the steering assist control.

Further, the steering assist control apparatus may include a holding detection unit that detects whether a driver of the own vehicle holds a steering wheel, and when the holding detection unit detects that the driver holds the steering wheel, the control stop unit, for the same manner of the recognition abnormality, may decrease the manipulated variable at a higher manipulated variable decrease rate than a manipulated variable decrease rate when the holding detection unit does not detect that the driver holds the steering wheel.

In the case where the driver holds the steering wheel at the time of the occurrence of the abnormality in recognition, it is highly likely to intend to perform driving operation by oneself. Hence, according to the configuration, when the driver holds the steering wheel, the manipulated variable is decreased at a higher manipulated variable decrease rate than a manipulated variable decrease rate when the driver does not hold the steering wheel. Therefore, it is possible to more adequately decrease the manipulated variable for the steering assist control, corresponding to the intention that the driver performs driving operation by oneself.

According to an aspect of the invention, at the time of the occurrence of the recognition abnormality, it is possible to more adequately decrease the manipulated variable for the steering assist control, corresponding to the manner of the abnormality in recognition.

A steering assist control method according to another aspect of the invention includes: recognizing a lane using a pickup image, the lane being a lane along which an own vehicle runs, the pickup image being a pickup image of a forward sight of the own vehicle in a travelling direction of the own vehicle; detecting at least any one of (i) an abnormality in recognition of lane made by the lane recognition unit and a manner of the abnormality in the recognition and (ii) a control abnormality in the steering assist control unit and a manner of the control abnormality; calculating a manipulated variable by which the own vehicle runs along the recognized lane; setting a decrease rate corresponding to at least any one of the manner of the abnormality in recognition and the manner of the control abnormality; and performing steering assist control based on the manipulated variable decreased at the decrease rate.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 2 is a flowchart showing control steps of the steering assist control apparatus in FIG. 1;

FIG. 3 is a table showing decrease rates that are set corresponding to manners of abnormalities;

DETAILED DESCRIPTION OF EMBODIMENTS

Figure 1:
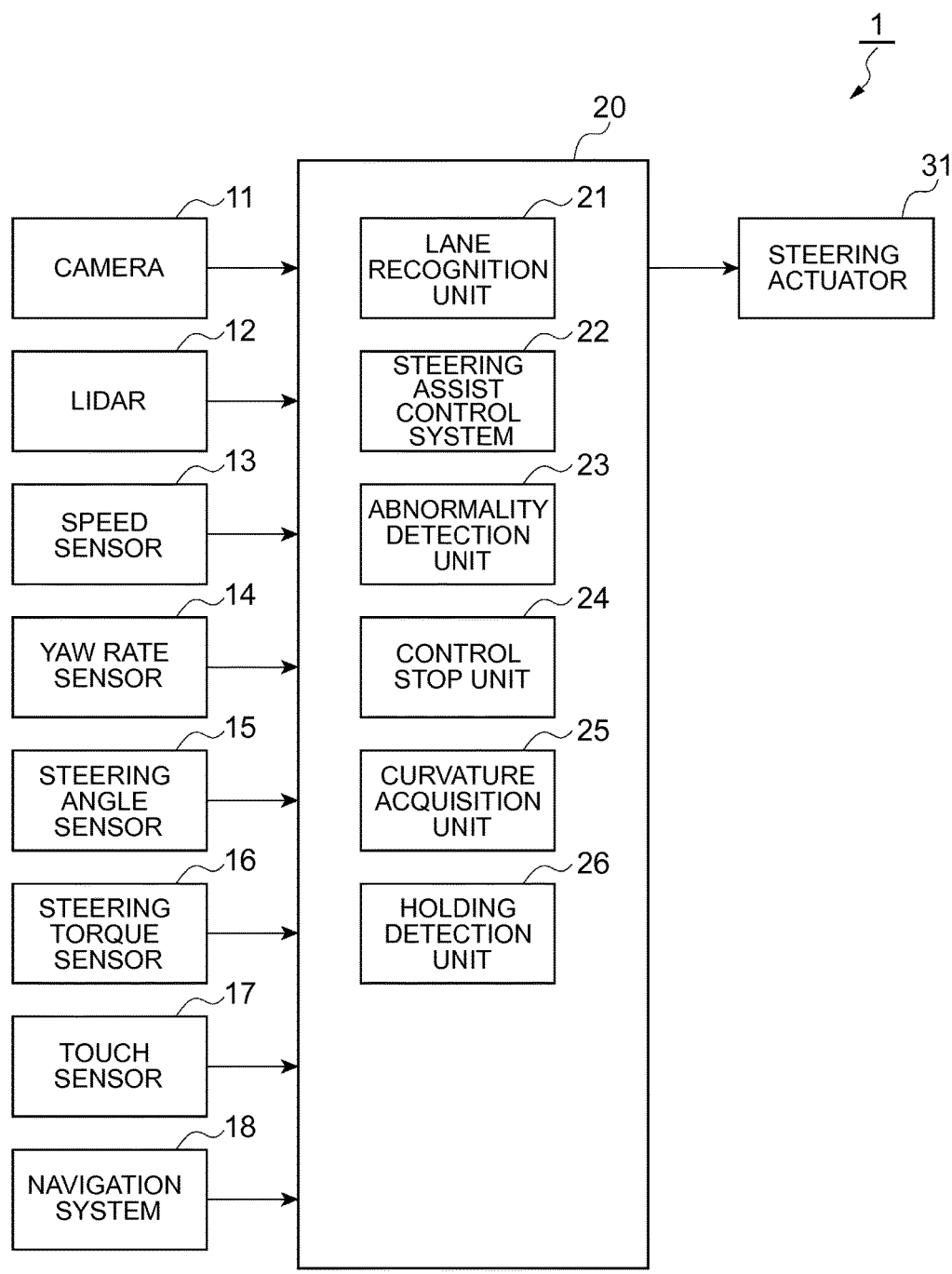
FIG. 1 is a block diagram showing a steering assist control apparatus in an embodiment.

Hereinafter, a steering assist control apparatus according to an embodiment of the invention will be described in detail, with reference to the drawings. A steering assist control apparatus 1 shown in FIG. 1 is a device to recognize a lane along which an own vehicle runs, using a pickup image of a forward sight of the own vehicle in a travelling direction of the own vehicle, and to control the steering of the own vehicle such that the own vehicle runs along the lane. The steering assist control means that the steering of the own vehicle is controlled by a manipulated variable allowing the own vehicle to run along the lane. The steering assist control apparatus 1 includes a camera 11, a lidar 12, a speed sensor 13, a yaw rate sensor 14, a steering angle sensor 15, a steering torque sensor 16, a touch sensor 17, a navigation system 18, an ECU 20, and a steering actuator 31.

The camera 11 is an image pickup apparatus that images a forward sight of the own vehicle. As the camera 11, for example, a CCD camera and a CMOS camera can be applied. For recognizing two lane lines demarcating a lane along which the own vehicle runs, the camera 11 images a road along which the own vehicle runs, and thereby, acquires a pickup image of the forward sight in a travelling direction of the own vehicle. The output from the camera 11 is input to the ECU 20, and the pickup image by the camera 11 is acquired by the ECU 20.

The lidar 12 acquires a pickup image of the forward sight in the travelling direction of the own vehicle, by emitting pulsed laser light ahead of the own vehicle and measuring the reflected light from a road surface. The lane line and a road surface with no lane line are different in the reflectance of the laser light, and therefore, it is possible to recognize the lane line by utilizing the difference in the light intensity of the reflected light. The lidar 12 emits the laser light by itself, and therefore, has an advantage of being less affected by natural light. The output from the lidar 12 is input to the ECU 20, and the information about the reflected light from the road surface, which is acquired by the lidar 12, is acquired by the ECU 20. Here, the steering assist control apparatus 1 in the embodiment does not need to include both of the camera 11 and the lidar 12, and may include any one of the camera 11 and the lidar 12. Further, the steering assist control apparatus 1 may include a millimeter-wave radar, instead of the lidar 12.

The speed sensor 13 is a sensor to measure the vehicle speed in the travelling direction of the own vehicle, by detecting the rotational speed of a wheel of the own vehicle as a pulse signal. The output from the speed sensor 13 is input to the ECU 20, and the pulse signal detected by the speed sensor 13 is acquired by the ECU 20.

The yaw rate sensor 14 is a sensor to detect the yaw rate (rotational angular velocity) around the vertical axis at the gravity center of the own vehicle. As the yaw rate sensor 14, for example, a gyro sensor can be used. The yaw rate sensor 14 outputs a signal corresponding to the detected yaw rate of the vehicle, to the ECU 20.

The steering angle sensor 15 is a sensor to detect the steering angle of the own vehicle. The steering angle sensor is attached to a steering shaft, for example, and outputs, to the ECU 20, a signal corresponding to the left-right orientation of the steering angle, the neutral position and the steering angle. For example, the steering angle sensor 15 is constituted by a light-emitting diode, a phototransistor, a slit plate attached to the steering shaft, and the like. The light-emitting diode and the phototransistor face each other across the slit plate. The slit plate rotating with the steering shaft transmits or blocks the light from the light-emitting diode, and the phototransistor is turned ON or OFF. Thereby, a signal corresponding to the steering angle is output. The steering angle sensor 15 may be incorporated in the interior of the steering actuator 31.

The steering torque sensor 16 is provided on the steering shaft of the own vehicle, for example, and detects the steering torque that the driver of the own vehicle gives to a steering wheel. The steering torque sensor 16 sends the information relevant to the detected steering torque, to the ECU 20.

The touch sensor 17 is provided on the steering wheel of the own vehicle, for example, and detects the contact of the driver of the own vehicle with the steering wheel and the holding pressure of the driver for the steering wheel. As the touch sensor 17, for example, a pressure-sensitive sensor can be used. The touch sensor 17 sends the information relevant to the contact of the driver with the steering wheel and the holding pressure for the steering wheel, to the ECU 20. Here, the steering assist control apparatus 1 in the embodiment does not need to include both of the steering torque sensor 16 and the touch sensor 17, and may include any one of the steering torque sensor 16 and the touch sensor 17.

The navigation system 18 is used to acquire the shape of the road along which the own vehicle runs. The navigation system 18 is constituted by a GPS (Global Positioning System), an acceleration sensor, a gyro sensor and a database in which map information is stored. The navigation system 18 measures the position of the own vehicle, by the information obtained from the GPS, the acceleration sensor, the gyro sensor and speed sensor 13. From the map information and the position of the own vehicle, the navigation system 18 acquires the information relevant to the curvature of the lane along which the own vehicle runs.

The ECU (Electronic Control Unit) 20 is a computer that controls the steering assist control apparatus 1. The ECU 20 includes a CPU (Central Processing Unit), memories such as a ROM (Read Only Memory) and a RAM (Random Access Memory), input and output interfaces, and the like. The ECU 20 includes a lane recognition unit 21, a steering assist control unit 22, an abnormality detection unit 23, a control stop unit 24, a curvature acquisition unit 25 and a holding detection unit 26. The hardware of the ECU 20 operates in accordance with a previously determined program, and thereby, the hardware of the ECU 20 functions as the lane recognition unit 21, the steering assist control unit 22, the abnormality detection unit 23, the control stop unit 24, the curvature acquisition unit 25 and the holding detection unit 26.

The lane recognition unit 21 discriminates the lane lines demarcating the lane, based on the pickup image of the forward sight of the vehicle in the own vehicle travelling direction acquired by the camera 11 or the lidar 12, and thereby, recognizes the lane along which the own vehicle runs. The lane recognition unit 21 acquires the information relevant to each position of the two lane lines relative to the own vehicle. Further, the lane recognition unit 21 acquires the information relevant to the interval (lane width) between the respective two lane lines.

The steering assist control unit 22 gives a manipulated variable to a steering system of the own vehicle, such that the own vehicle runs along the lane recognized by the lane recognition unit 21, and thereby, controls the steering of the own vehicle. The steering assist control unit 22 calculates the steering torque necessary for the own vehicle to run along the lane, as the manipulated variable for the steering angle, based on the vehicle speed detected by the speed sensor 13, the yaw rate detected by the yaw rate sensor 14, and the steering angle detected by the steering angle sensor. The steering assist control unit 22 sends a control signal to the steering actuator 31, such that the steering actuator 31 outputs the calculated steering torque.

The abnormality detection unit 23 detects an abnormality in the steering assist control apparatus 1 and a manner of the abnormality. The abnormality detection unit 23 detects an abnormality in a recognition of the lane made by the lane recognition unit 21 and a manner of the recognition abnormality, as the abnormality in the steering assist control apparatus 1 and the manner of the abnormality. The recognition abnormality means a state in which the lane recognition unit 21 cannot perform the normal recognition of the lane along which the own vehicle runs. As the manner of the recognition abnormality in the lane recognition unit 21, the abnormality detection unit 23 detects a first abnormality manner in which the lane recognition unit 21 cannot discriminate the lane line demarcating the lane from the pickup image, a second abnormality manner in which the interval between the two lane lines discriminated by the lane recognition unit 21 is broader than a previously set value, and a third abnormality manner in which the position of the lane line discriminated by the lane recognition unit 21 varies at a higher frequency than a previously set frequency.

The first abnormality manner is a manner of the recognition abnormality in which the lane recognition unit 21 cannot discriminate the lane line demarcating the lane from the pickup image, for example, in the case where the own vehicle runs along a curve having a great curvature, in the case where the own vehicle runs at a section where the lane line is light or a section where the lane line is interrupted, or in the case of rain or the like. When the lane recognition unit 21 cannot discriminate a part or a whole of the lane line, the abnormality detection unit 23 detects that the manner of the recognition abnormality is the first abnormality manner.

The second abnormality manner is a manner of the recognition abnormality in which the interval between the two lane lines discriminated by the lane recognition unit 21 is broader than a previously set value, for example, because the lane recognition unit 21 falsely discriminates a lane line demarcating a branched lane as the lane line of the lane along which the own vehicle runs. When the interval between the two lane lines discriminated by the lane recognition unit 21 exceeds the previously set value, the abnormality detection unit 23 detects that the manner of the recognition abnormality is the second abnormality manner. As the previously set value in this case, for example, an average interval of the two lane lines that corresponds to the road type, or a 1.5 to 2.2 fold or 1.6 to 2.0 fold value of the interval between the two lane lines normally recognized by the lane recognition unit 21 can be set.

The third abnormality manner is a manner of the recognition abnormality in which the position of the lane line discriminated by the lane recognition unit 21 varies at a higher frequency than a previously set frequency, for example, because the lane recognition unit 21 recognizes a lane line configured by a composite line of a solid line and a broken line. When the position of the lane line recognized by the lane recognition unit 21 varies at a higher frequency than the previously set frequency, the abnormality detection unit 23 detects that the manner of the recognition abnormality involves a composite line. As the previously set frequency in this case, for example, a frequency in which the position of the lane line varies one or more times while the own vehicle runs for a distance of 0.5 to 5 m can be set. The information relevant to the presence or absence of the recognition abnormality and the manner of the recognition abnormality that are detected by the abnormality detection unit 23 is sent to the control stop unit 24.

Further, the abnormality detection unit 23 detects a control abnormality in the steering assist control apparatus 1, as the abnormality in the steering assist control apparatus 1 and the manner of the abnormality. The control abnormality means a state in which the devices of the steering assist control apparatus 1 cannot perform the normal control due to failure or the like. The abnormality detection unit 23 detects, as the control abnormality, a CAN communication interruption in which the communication of a CAN (Controller Area Network) connecting the ECU 20 of the steering assist control apparatus 1 with the camera 11 and the like is interrupted. Further, the abnormality detection unit 23 detects the CAN communication interruption, for example, by the update condition of the information from the camera 11 and the like. Further, the abnormality detection unit 23 detects, as the control abnormality, an ECU abnormal-value output in which the output of the steering assist control unit 22 or the like of the ECU 20 is an abnormal value. The abnormality detection unit 23 detects the ECU abnormal-value output, for example, by the guard processing of the ECU 20. Further, the abnormality detection unit 23 detects, as the control abnormality, a steering actuator abnormality in which the steering actuator 31 is abnormal. The abnormality detection unit 23 detects the actuator abnormality by the information sent from the steering actuator 31 and the steering angle sensor 15.

The control stop unit 24 decreases the manipulated variable for controlling the steering of the own vehicle, when the abnormality detection unit 23 detects the recognition abnormality in the lane recognition unit 21 or when the abnormality detection unit 23 detects the control abnormality in the steering assist control apparatus 1. Further, as described later, the control stop unit 24 decreases the manipulated variable at a manipulated variable decrease rate corresponding to the manner of the recognition abnormality or the control abnormality. The manipulated variable decrease rate means the decrease amount of the manipulated variable per time. In the embodiment, the manipulated variable decrease rates corresponding to the manners of the abnormalities are previously stored in the database of the control stop unit 24.

Further, when the curvature acquired by the curvature acquisition unit 25 is a previously set threshold or more, the control stop unit 24, for the same manner of the recognition abnormality or the control abnormality, decreases the manipulated variable at a lower manipulated variable decrease rate than a manipulated variable decrease rate when the curvature is less than the threshold. Further, when the holding detection unit 26 detects that the driver holds the steering wheel, the control stop unit 24, for the same manner of the recognition abnormality or the control abnormality, decreases the manipulated variable at a higher manipulated variable decrease rate than a manipulated variable decrease rate when the holding detection unit 26 does not detect that the driver holds the steering wheel.

The curvature acquisition unit 25 acquires the curvature of the lane along which the own vehicle runs. The curvature acquisition unit 25 acquires the curvature of the lane along which the own vehicle runs, from the curvature of the two lane lines, a guardrail, a curb or the like, based on the pickup images by the camera 11 and the lidar 12. Alternatively, the curvature acquisition unit 25 may acquire the curvature of the lane, based on the shape of the lane along which the own vehicle runs, which is acquired by the navigation system 18. The curvature acquisition unit 25 sends the acquired curvature of the lane, to the control stop unit 24.

The holding detection unit 26 detects whether the driver of the own vehicle holds the steering wheel. The holding detection unit 26 detects whether the driver holds the steering wheel, from the information acquired by the steering torque sensor 16 or the touch sensor 17.

The steering actuator 31, for example, is an electronic unit that controls an electric power steering system [EPS: Electric Power Steering] of the own vehicle. The steering actuator 31 drives an assist motor that is of the electric power steering system and that controls the steering torque of the own vehicle, and thereby, controls the steering angle of the own vehicle. The steering actuator 31 controls the steering angle, corresponding to the control signal from the steering assist control unit 22 of the ECU 20. The steering actuator 31 feeds back the steering torque and steering angle generated by the steering actuator 31, to the steering assist control unit 22 and the abnormality detection unit 23.

Hereinafter, a control of the steering assist control apparatus 1 in the embodiment will be described. As a premise, suppose a situation in which the steering assist control is started by an input operation from the driver of the own vehicle. As shown in FIG. 2, the lane recognition unit 21 of the ECU 20 recognizes the lane along which the own vehicle runs, using the pickup image of the forward sight of the own vehicle in the travelling direction of the own vehicle (S11). The abnormality detection unit 23 of the ECU 20 detects the recognition abnormality of the lane recognition unit 21, the manner of the recognition abnormality, the control abnormality and the manner of the control abnormality (S12).

If the abnormality detection unit 23 detects the recognition abnormality or the control abnormality, the control stop unit 24 of the ECU 20 selects, from the database of the control stop unit 24, a manipulated variable decrease rate corresponding to (a) the manner of the recognition abnormality or the manner of the control abnormality that is detected by the abnormality detection unit 23 of the ECU 20, (b) whether the curvature of the lane along which the own vehicle runs, which is acquired by the curvature acquisition unit 25 of the ECU 20, is the previously set threshold or more, and (c) whether the driver of the own vehicle holds the steering wheel, which is detected by the holding detection unit 26 of the ECU 20 (S13).

As shown in a table of FIG. 3, in the database of the control stop unit 24, the manipulated variable decrease rates corresponding to the manner of the recognition abnormality, the manner of the control abnormality, whether the curvature of the lane along which the own vehicle runs is the previously set threshold or more, and whether the driver of the own vehicle holds the steering wheel are previously stored. Here, in the embodiment, when the curvature of the lane along which the own vehicle runs, which is acquired by the curvature acquisition unit 25, is less than the threshold, it is determined that the own vehicle runs along a straight lane.

Further, when the curvature of the lane acquired by the curvature acquisition unit 25 is the threshold or more, it is determined that the own vehicle runs along a curved lane. The threshold for determining whether the own vehicle runs along a straight line or runs along a curved lane can be set in a range of 100 to 1000 R, for example.

As shown in FIG. 3, in the case of the steering actuator abnormality, the steering assist control is immediately stopped, regardless of whether the driver of the own vehicle holds the steering wheel, and whether the own vehicle runs along a straight lane or runs along a curved lane.

Figure 4:
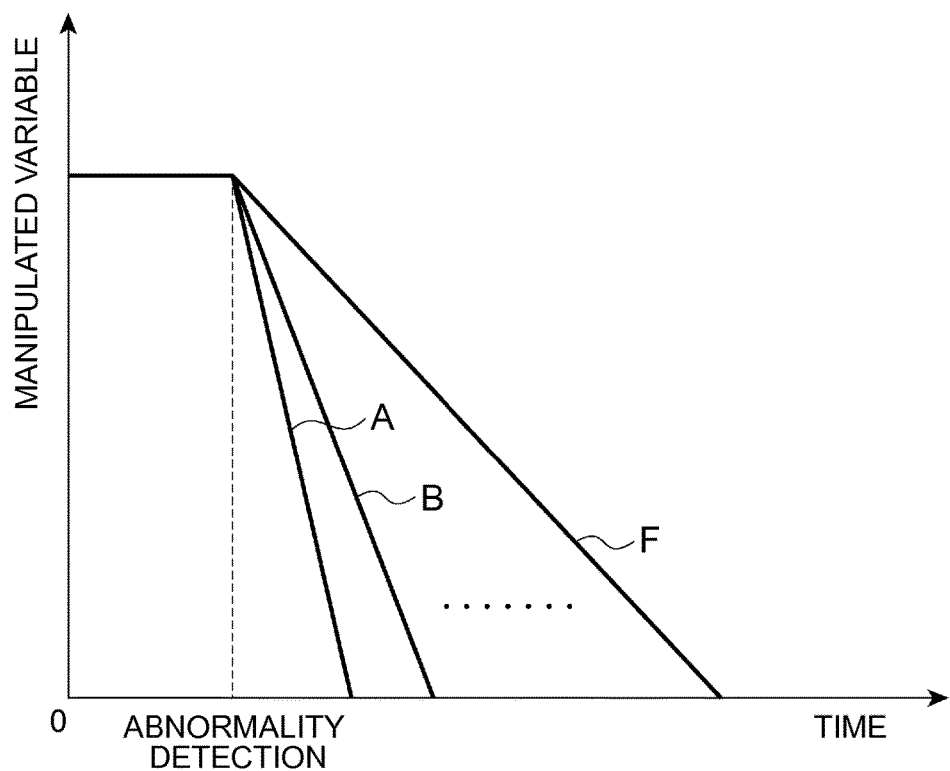
FIG. 4 is a graph showing an example of change in manipulated variable for each decrease rate.

In the following, in the table of FIG. 3, the case where the driver of the own vehicle holds the steering wheel and where the own vehicle runs along a straight lane will be described. As shown in FIG. 3 and FIG. 4, manipulated variable decrease rate A>manipulated variable decrease rate B> . . . >manipulated variable decrease rate E holds. In the case of the recognition abnormality, when the abnormality detection unit 23 detects the first abnormality manner, the manipulated variable decrease rate E (the first manipulated decrease rate) is selected as the manipulated variable decrease rate. Further, when the abnormality detection unit 23 detects the second abnormality manner, the manipulated variable decrease rate D (the second manipulated variable decrease rate), which is higher than the manipulated variable decrease rate E, is selected as the manipulated variable decrease rate. Further, when the abnormality detection unit 23 detects the third abnormality manner, the manipulated variable decrease rate C (the third manipulated variable decrease rate), which is higher than the manipulated variable decrease rate D, is selected as the manipulated variable decrease rate.

Further, when the abnormality detection unit 23 detects the CAN communication interruption as the manner of the control abnormality, the manipulated variable decrease rate B is selected as the manipulated variable decrease rate. When the abnormality detection unit 23 detects the ECU abnormal-value output as the manner of the control abnormality, the manipulated variable decrease rate A, which is higher than the manipulated variable decrease rate B, is selected as the manipulated variable decrease rate.

Next, the case where the driver of the own vehicle holds the steering wheel and where the own vehicle runs along a curved lane will be described. In FIG. 3, manipulated variable decrease rate F>manipulated variable decrease rate G> . . . >manipulated variable decrease rate J holds. Therefore, similarly to the above-described case where the driver of the own vehicle holds the steering wheel and where the own vehicle runs along a straight lane, the manipulated variable decrease rate J (the first manipulated variable decrease rate) is selected as the manipulated variable decrease rate at the time of the first abnormality manner, the manipulated variable decrease rate I (the second manipulated variable decrease rate), which is higher than the manipulated variable decrease rate J, is selected as the manipulated variable decrease rate at the time of the second abnormality manner, and the manipulated variable decrease rate H (the third manipulated variable decrease rate), which is higher than the manipulated variable decrease rate I, is selected as the manipulated variable decrease rate at the time of the third abnormality manner. Further, when the CAN communication interruption is detected, the manipulated variable decrease rate G is selected as the manipulated variable decrease rate. When the abnormality detection unit 23 detects the ECU abnormal-value output as the manner of the control abnormality, the manipulated variable decrease rate F, which is higher than the manipulated variable decrease rate G, is selected as the manipulated variable decrease rate.

In FIG. 3, manipulated variable decrease rate A>manipulated variable decrease rate B> . . . >manipulated variable decrease rate E>manipulated variable decrease rate F>manipulated variable decrease rate G> . . . >manipulated variable decrease rate J holds. That is, for the same manner of the recognition abnormality or the control abnormality, in the case where the driver of the own vehicle holds the steering wheel, when the own vehicle runs along a curved lane, a lower manipulated variable decrease rate is selected than when the own vehicle runs along a straight lane.

Next, the case where the driver of the own vehicle does not hold the steering wheel and where the own vehicle runs along a straight lane will be described. In FIG. 3, manipulated variable decrease rate K>manipulated variable decrease rate L> . . . >manipulated variable decrease rate O holds. Therefore, similarly to the above-described case where the driver of the own vehicle holds the steering wheel and where the own vehicle runs along a straight line, the manipulated variable decrease rate O (the first manipulated variable decrease rate) is selected as the manipulated variable decrease rate at the time of the first abnormality manner, the manipulated variable decrease rate N (the second manipulated variable decrease rate), which is higher than the manipulated variable decrease rate O, is selected as the manipulated variable decrease rate at the time of the second abnormality manner, and the manipulated variable decrease rate M (the third manipulated variable decrease rate), which is higher than the manipulated variable decrease rate N, is selected as the manipulated variable decrease rate at the time of the third abnormality manner. Further, when the CAN communication interruption is detected, the manipulated variable decrease rate L is selected as the manipulated variable decrease rate. When the abnormality detection unit 23 detects the ECU abnormal-value output as the manner of the control abnormality, the manipulated variable decrease rate K, which is higher than the manipulated variable decrease rate L, is selected as the manipulated variable decrease rate.

In FIG. 3, manipulated variable decrease rate A>manipulated variable decrease rate B> . . . >manipulated variable decrease rate E>manipulated variable decrease rate F>manipulated variable decrease rate G> . . . >manipulated variable decrease rate J>manipulated variable decrease rate K>manipulated variable decrease rate L> . . . >manipulated variable decrease rate O holds. That is, in the case where the own vehicle runs along a straight lane, for the same manner of the recognition abnormality or the control abnormality, when the holding detection unit 26 detects that the driver holds the steering wheel, a higher manipulated variable decrease rate is selected than when the holding detection unit 26 does not detect that the driver holds the steering wheel.

Next, the case where the driver of the own vehicle does not hold the steering wheel and where the own vehicle runs along a curved lane will be described. In FIG. 3, manipulated variable decrease rate P>manipulated variable decrease rate Q> . . . >manipulated variable decrease rate T holds. Therefore, similarly to the above-described case where the driver of the own vehicle holds the steering wheel and where the own vehicle runs along a straight lane, the manipulated variable decrease rate T (the first manipulated variable decrease rate) is selected as the manipulated variable decrease rate at the time of the first abnormality manner, the manipulated variable decrease rate S (the second manipulated variable decrease rate), which is higher than the manipulated variable decrease rate T, is selected as the manipulated variable decrease rate at the time of the second abnormality manner, and the manipulated variable decrease rate R (the third manipulated variable decrease rate), which is higher than the manipulated variable decrease rate S, is selected as the manipulated variable decrease rate at the time of the third abnormality manner. Further, when the CAN communication interruption is detected, the manipulated variable decrease rate Q is selected as the manipulated variable decrease rate. When the abnormality detection unit 23 detects the ECU abnormal-value output as the manner of the control abnormality, the manipulated variable decrease rate P, which is higher than the manipulated variable decrease rate Q, is selected as the manipulated variable decrease rate.

In FIG. 3, manipulated variable decrease rate A>manipulated variable decrease rate B> . . . >manipulated variable decrease rate E>manipulated variable decrease rate F>manipulated variable decrease rate G> . . . >manipulated variable decrease rate J>manipulated variable decrease rate K>manipulated variable decrease rate L> . . . >manipulated variable decrease rate O>manipulated variable decrease rate P>manipulated variable decrease rate Q> . . . >manipulated variable decrease rate T holds. That is, in the case where the driver of the own vehicle does not hold the steering wheel, for the same manner of the recognition abnormality or the control abnormality, when the own vehicle runs along a curved lane, a lower manipulated variable decrease rate is selected than when the own vehicle runs along a straight lane.

Here, it is not always necessary that the manipulated variable decrease rates A to T are set to sequentially different values such that manipulated variable decrease rate A>manipulated variable decrease rate B> . . . >manipulated variable decrease rate T holds. For example, in the same situation about whether the own vehicle runs along a straight line and whether the steering wheel is held, it is only necessary that the manipulated variable decrease rate for the second abnormality manner is higher than the manipulated variable decrease rate for the first abnormality manner, and the manipulated variable decrease rate for the third abnormality manner is higher than the manipulated variable decrease rate for the second abnormality manner. Further, for example, for the manipulated variable decrease rates A to T, in the same manner of the recognition abnormality or the control abnormality, it is only necessary that when the own vehicle runs along a curved lane, a lower manipulated variable decrease rate is selected than when the own vehicle runs along a straight lane, and when the holding detection unit 26 detects that the driver holds the steering wheel, a higher manipulated variable decrease rate is selected than when the holding detection unit 26 does not detect that the driver holds the steering wheel. In this case, some of the manipulated variable decrease rates A to T may be set to the same value.

Further, as the manipulated variable decrease rate, values to vary with time may be set. Here, when recognition abnormalities and control abnormalities with different manners occur simultaneously, the control stop unit 24 selects the highest manipulated variable decrease rate of the manipulated variable decrease rates respectively corresponding to the manners of the recognition abnormalities and control abnormalities.

The control stop unit 24 calculates the manipulated variable, by decreasing the manipulated variable decrease rate corresponding to the result of the lane recognition at the selected manipulated variable decrease rate (S14). The steering assist control unit 22 drives the steering actuator 31 by the calculated manipulated variable, and performs the steering assist control (S15). Meanwhile, when the abnormality detection unit 23 does not detect the recognition abnormality and the control abnormality (S12), the control stop unit 24 calculates the manipulated variable corresponding to the result of the lane recognition (S16).

The above processes S11 to S16 are repeatedly performed every 1 to 500 ms, by the ECU 20. The steering assist control by the steering assist control apparatus 1 finishes when the manipulated variable decreased at the manipulated variable decrease rate becomes 0. Further, the steering assist control by the steering assist control apparatus 1 finishes when the driver of the own vehicle performs an input operation to stop the steering assist control.

Figure 5:
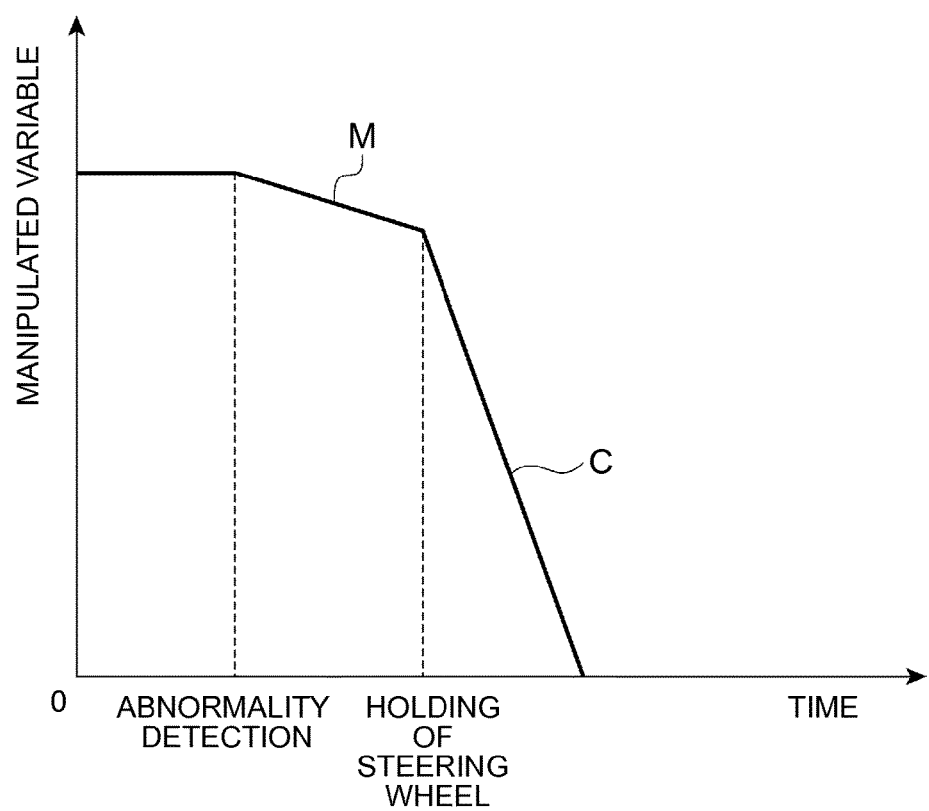
FIG. 5 is a graph showing another example of change in manipulated variable for each decrease rate.

Here, when the situation of whether the curvature of the vehicle acquired by the curvature acquisition unit 25 is the previously set threshold or more or whether the holding detection unit 26 detects that the driver holds the steering wheel changes while the manipulated variable is being decreased at the manipulated variable decrease rate, the control stop unit 24 decreases the manipulated variable at a manipulated variable decrease rate corresponding to the changed situation. For example, as shown in FIG. 5, after the abnormality detection unit 23 detects the abnormality and before the holding detection unit 26 detects that the driver holds the steering wheel, the control stop unit 24 decreases the manipulated variable at the manipulated variable decrease rate M, and after the holding detection unit 26 detects that the driver holds the steering wheel, the control stop unit 24 decreases the manipulated variable at the manipulated variable decrease rate C, which is higher than the manipulated variable decrease rate M.

According to the embodiment, the control stop unit 24 decreases the manipulated variable at the manipulated variable decrease rate corresponding to the manner of the recognition abnormality. Thereby, at the time of the occurrence of the abnormality, it is possible to more adequately decrease the manipulated variable for the steering assist control, corresponding to the manner of the abnormality.

Further, according to the embodiment, in the case where the driver of the own vehicle holds the steering wheel and where the own vehicle runs along a straight lane, the control stop unit 24 decreases the manipulated variable at the manipulated variable decrease rate E when the abnormality detection unit 23 detects the first abnormality manner, decreases the manipulated variable at the manipulated variable decrease rate D, which is higher than the manipulated variable decrease rate E, when the abnormality detection unit 23 detects the second abnormality manner, and decreases the manipulated variable at the manipulated variable decrease rate C, which is higher than the manipulated variable decrease rate D, when the abnormality detection unit 23 detects the third abnormality manner.

For example, in the case of the first abnormality manner in which the lane recognition unit 21 cannot discriminate the lane line demarcating the lane from the pickup image when the own vehicle runs along a curve having a great curvature or when the own vehicle runs at a section where the lane line is interrupted, it is expected that the lane recognition unit 21 can recognize the lane line again after the own vehicle passes through the curve. Therefore, in the case where the manner of the recognition abnormality is the first abnormality manner, the manipulated variable is decreased at the manipulated variable decrease rate E, which is lower compared to the manipulated variable decrease rate D for the second abnormality manner and the manipulated variable decrease rate C for the third abnormality manner.

Further, in the case of the second abnormality manner in which the interval between the two lane lines discriminated by the lane recognition unit 21 is broader than the previously set value, it is thought, for example, that the lane recognition unit 21 has falsely discriminated a lane line demarking a branched lane as the lane line of the lane along which the own vehicle runs. In this case, it is likely that the steering assist control unit 22 performs an inadequate steering such as a steering in an intermediate direction between the lane along which the own vehicle runs and the branched lane. Therefore, in the case where the manner of the recognition abnormality is the second abnormality manner, the manipulated variable is decreased at the manipulated variable decrease rate D, which is higher compared to the manipulated variable decrease rate E for the first abnormality manner.

Furthermore, in the case of the third abnormality manner in which the position of the lane line discriminated by the lane recognition unit 21 varies at a higher frequency than the previously set frequency, it is thought, for example, that the lane recognition unit 21 has recognized a lane line configured by a composite line of a solid line and a broken line. In this case, it is likely that the recognition of the lane line by the lane recognition unit 21 is unstable over a relatively long time. Therefore, in the case where the manner of the recognition abnormality is the third abnormality manner, the manipulated variable is decreased at the manipulated variable decrease rate C, which is higher compared to the manipulated variable decrease rate D for the second abnormality manner. Thus, even when the recognition abnormality occurs, it is possible to more adequately decrease the manipulated variable for the steering assist control, corresponding to the manner of the recognition abnormality.

In a curve having a great curvature, when the manipulated variable is decreased at a higher manipulated variable decrease rate, the behavior of the own vehicle is likely to be unstable. Hence, in the embodiment, when the curvature of the lane along which the own vehicle runs is the previously set threshold or more, the manipulated variable is decreased at a lower manipulated variable decrease rate than a manipulated variable decrease rate when the curvature is less than the threshold, for the same manner of the recognition abnormality. Therefore, in a curve having a great curvature, it is possible to enhance the stability of the steering assist control.

In the case where the driver holds the steering wheel at the time of the occurrence of the recognition abnormality, it is highly likely to intend to perform driving operation by oneself. Hence, in the embodiment, when the driver holds the steering wheel, the manipulated variable is decreased at a higher manipulated variable decrease rate than a manipulated variable decrease rate when the driver does not hold the steering wheel. Therefore, it is possible to more adequately decrease the manipulated variable for the steering assist control, corresponding to the intention that the driver performs driving operation by oneself.

Here, the steering assist control apparatus 1 in the embodiment of the invention is not limited to the above embodiment, and needless to say, various modifications can be made in a range without departing from the spirit of the embodiment of the invention. For example, in the above embodiment, the steering assist control apparatus 1 may further include an awakening degree detection unit that detects the awakening degree of the driver of the own vehicle, and the control stop unit 24 may decrease the manipulated variable at a lower decrease rate, as the awakening degree of the driver by the awakening degree detection unit becomes lower.

Alternatively, the steering assist control apparatus 1 may further include a traffic volume detection unit that detects the traffic volume around the own vehicle, and the control stop unit 24 may decrease the manipulated variable at a lower manipulated variable decrease rate, as the traffic volume detected by the traffic volume detection unit becomes larger.

What is claimed is:

1. A steering assist control apparatus comprising:
an electronic control unit (ECU) programmed to:
recognize a lane using a pickup image, the lane being a lane along which an own vehicle runs, the pickup image being a pickup image of a forward sight of the own vehicle in a travelling direction of the own vehicle;
give a manipulated variable to a steering system of the own vehicle such that the own vehicle runs along the lane recognized by the ECU, the manipulated variable being a manipulated variable by which steering of the own vehicle is controlled;
detect at least any one of (i) an abnormality in recognition of the lane made and a manner of the abnormality in the recognition and (ii) a control abnormality and a manner of the control abnormality; and
decrease the manipulated variable with time, when at least any one of the abnormality in recognition of the lane and the control abnormality is detected,
wherein the manipulated variable is decreased at a manipulated variable decrease rate corresponding to at least any one of the manner of the abnormality in recognition and the manner of the control abnormality,
wherein, the ECU is further programmed to detect a first abnormality manner, a second abnormality manner and a third abnormality manner, as the detected manner of the abnormality in recognition of the lane, and to decrease the manipulated variable at a manipulated variable decrease rate which varies in accordance with the detected manner or the abnormality in recognition of the lane.

2. The steering assist control apparatus according to claim 1, wherein
the first abnormality manner is an abnormality manner in which the ECU cannot discriminate a lane line from the pickup image, the lane line demarcating the lane, the second abnormality manner is an abnormality manner in which an interval between two of the lane lines discriminated by the ECU is broader than a previously set value, the third abnormality manner is an abnormality manner in which the position of the lane line discriminated by the ECU varies at a higher frequency than a previously set frequency, and
the ECU is further programmed to decrease the manipulated variable at a first manipulated variable decrease rate as the manipulated variable decrease rate when the first abnormality manner is detected,
decrease the manipulated variable at a second manipulated variable decrease rate as the manipulated variable decrease rate when the second abnormality manner is detected, the second manipulated variable decrease rate being higher than the first manipulated variable decrease rate, and
decrease the manipulated variable at a third manipulated variable decrease rate as the manipulated variable decrease rate when the third abnormality manner is detected, the third manipulated variable decrease rate being higher than the second manipulated variable decrease rate.

3. The steering assist control apparatus according to claim 2, wherein
when the ECU simultaneously detects two different abnormality manners of the first abnormality manner, the second abnormality manner and the third abnormality manner, the ECU selects the highest manipulated variable decrease rate of manipulated variable decrease rates respectively corresponding to the manners of the recognition abnormalities.

4. The steering assist control apparatus according to claim 1, wherein
the ECU is further programmed to:
detect a communication interruption abnormality, an output value abnormality and an actuator abnormality, as the manner of the control abnormality, the communication interruption abnormality being an abnormality in which communication is interrupted between the ECU and a camera that picks up an image in a travelling direction of the own vehicle, the output value abnormality being an abnormality in which an output value from the ECU is abnormal, the actuator abnormality being an abnormality of an actuator that generates steering torque, and
decrease the manipulated variable at a fourth manipulated variable decrease rate as the manipulated variable decrease rate when the communication interruption abnormality is detected,
decrease the manipulated variable at a fifth manipulated variable decrease rate as the manipulated variable decrease rate when the output value abnormality is detected, the fifth manipulated variable decrease rate being higher than the fourth manipulated variable decrease rate, and
decrease the manipulated variable at a sixth manipulated variable decrease rate as the manipulated variable decrease rate when the actuator abnormality is detected, the sixth manipulated variable decrease rate being lower than the fourth manipulated variable decrease rate.

5. The steering assist control apparatus according to claim 1, wherein the ECU is further programmed to: acquire curvature of the lane along which the own vehicle runs, wherein
when the curvature acquired by the ECU is a previously set threshold or more, the ECU is configured, for the same manner of the recognition abnormality, to decrease the manipulated variable at a lower manipulated variable decrease rate than a manipulated variable decrease rate when the curvature is less than the threshold.

6. The steering assist control apparatus according to claim 1, wherein the ECU is further programmed to:
detect whether a driver of the own vehicle holds a steering wheel,
wherein
when the ECU detects the driver holds the steering wheel, the ECU is configured, for the same manner of the recognition abnormality, to decrease the manipulated variable at a higher manipulated variable decrease rate than a manipulated variable decrease rate when the ECU does not detect that the driver holds the steering wheel.

7. A steering assist control method comprising:
- recognizing a lane using a pickup image, the lane being a lane along which an own vehicle runs, the pickup image being a pickup image of a forward sight of the own vehicle in a travelling direction of the own vehicle;
- detecting at least any one of (i) an abnormality in recognition of the lane and a manner of the abnormality in recognition, wherein the detected manner of the abnormality in recognition of the lane includes a first abnormality manner, a second abnormality manner and a third abnormality manner, and (ii) a control abnormality in a steering assist control unit that gives a manipulated variable to a steering system of the own vehicle such that the own vehicle runs along the lane recognized and a manner of the control abnormality;
- calculating a manipulated variable by which the own vehicle runs along the recognized lane;
- decreasing the manipulated variable at a manipulated variable decrease rate which varies in accordance with the detected manner of the abnormality in recognition of the lane; and
- performing steering assist control based on the manipulated variable decreased at the decrease rate.

* * * * *